United States Patent
Shoji

(10) Patent No.: US 11,734,118 B2
(45) Date of Patent: Aug. 22, 2023

(54) SOFTWARE WIRELESS DEVICE

(71) Applicant: HITACHI KOKUSAI ELECTRIC INC., Tokyo (JP)

(72) Inventor: Tomoya Shoji, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 232 days.

(21) Appl. No.: 17/272,801

(22) PCT Filed: Sep. 18, 2018

(86) PCT No.: PCT/JP2018/034359
§ 371 (c)(1),
(2) Date: Mar. 2, 2021

(87) PCT Pub. No.: WO2020/059004
PCT Pub. Date: Mar. 26, 2020

(65) Prior Publication Data
US 2021/0224160 A1    Jul. 22, 2021

(51) Int. Cl.
*G06F 11/14*    (2006.01)
*G06F 9/451*    (2018.01)
(Continued)

(52) U.S. Cl.
CPC ............ *G06F 11/1438* (2013.01); *G06F 8/61* (2013.01); *G06F 9/453* (2018.02);
(Continued)

(58) Field of Classification Search
CPC .............. G06F 11/1438; G06F 11/302; G06F 11/0793; G06F 11/0751; G06F 11/3055; G06F 11/30; G06F 9/453
See application file for complete search history.

(56) References Cited

U.S. PATENT DOCUMENTS 5,740,359 A    4/1998  Hasegawa et al.
8,515,794 B2 *  8/2013  Duparc ................. G06Q 10/06
                                                      709/202
(Continued)

FOREIGN PATENT DOCUMENTS

JP    H08-234968 A    9/1996
JP    2003-36210 A    2/2003
(Continued)

OTHER PUBLICATIONS

International Search Report dated Dec. 18, 2018.

*Primary Examiner* — Kamini B Patel
(74) *Attorney, Agent, or Firm* — Bacon & Thomas, PLLC

(57) ABSTRACT

This software wireless device comprises framework software that installs wireless communication software; and interface service software that is provided so as to be directly managed by an OS, and that manages a user interface service and the framework software. The framework software has user interface software, domain management software, hardware management software, and hardware control software. The interface service software issues a running status monitoring request to the user interface software and the domain management software, and determines that there is an abnormality if there is no response from the user interface software or the domain management software.

6 Claims, 11 Drawing Sheets

(51) Int. Cl.
    *G06F 8/61*           (2018.01)
    *G06F 11/27*        (2006.01)
    *H04W 88/02*      (2009.01)

(52) U.S. Cl.
    CPC .......... *G06F 11/1482* (2013.01); *G06F 11/27* (2013.01); *H04W 88/02* (2013.01)

(56) References Cited

U.S. PATENT DOCUMENTS

| | | | |
|---|---|---|---|
| 9,894,241 B2* | 2/2018 | Yagi | H04N 1/0097 |
| 10,824,437 B1* | 11/2020 | Righi | H04L 67/02 |
| 2003/0114163 A1* | 6/2003 | Bickle | G06F 9/465 |
| | | | 455/418 |
| 2006/0085206 A1* | 4/2006 | Seufert | G06F 8/70 |
| | | | 717/105 |
| 2008/0270562 A1* | 10/2008 | Jin | H04L 67/025 |
| | | | 709/208 |
| 2018/0278494 A1* | 9/2018 | Chen | B23Q 17/0971 |
| 2018/0365081 A1* | 12/2018 | Zeng | G06F 9/52 |
| 2019/0173779 A1* | 6/2019 | Gruner | H04L 45/745 |
| 2019/0332412 A1* | 10/2019 | Boggarapu | G06F 9/45558 |
| 2021/0149788 A1* | 5/2021 | Downie | G06F 11/3604 |

FOREIGN PATENT DOCUMENTS

| | | |
|---|---|---|
| JP | 2003-116168 A | 4/2003 |
| JP | 2004-258936 A | 9/2004 |
| JP | 2004-302929 A | 10/2004 |
| JP | 2004-537803 A | 12/2004 |
| JP | 2006-309413 A | 11/2006 |
| JP | 2007-148844 A | 6/2007 |
| JP | 2016-103217 A | 6/2016 |

\* cited by examiner

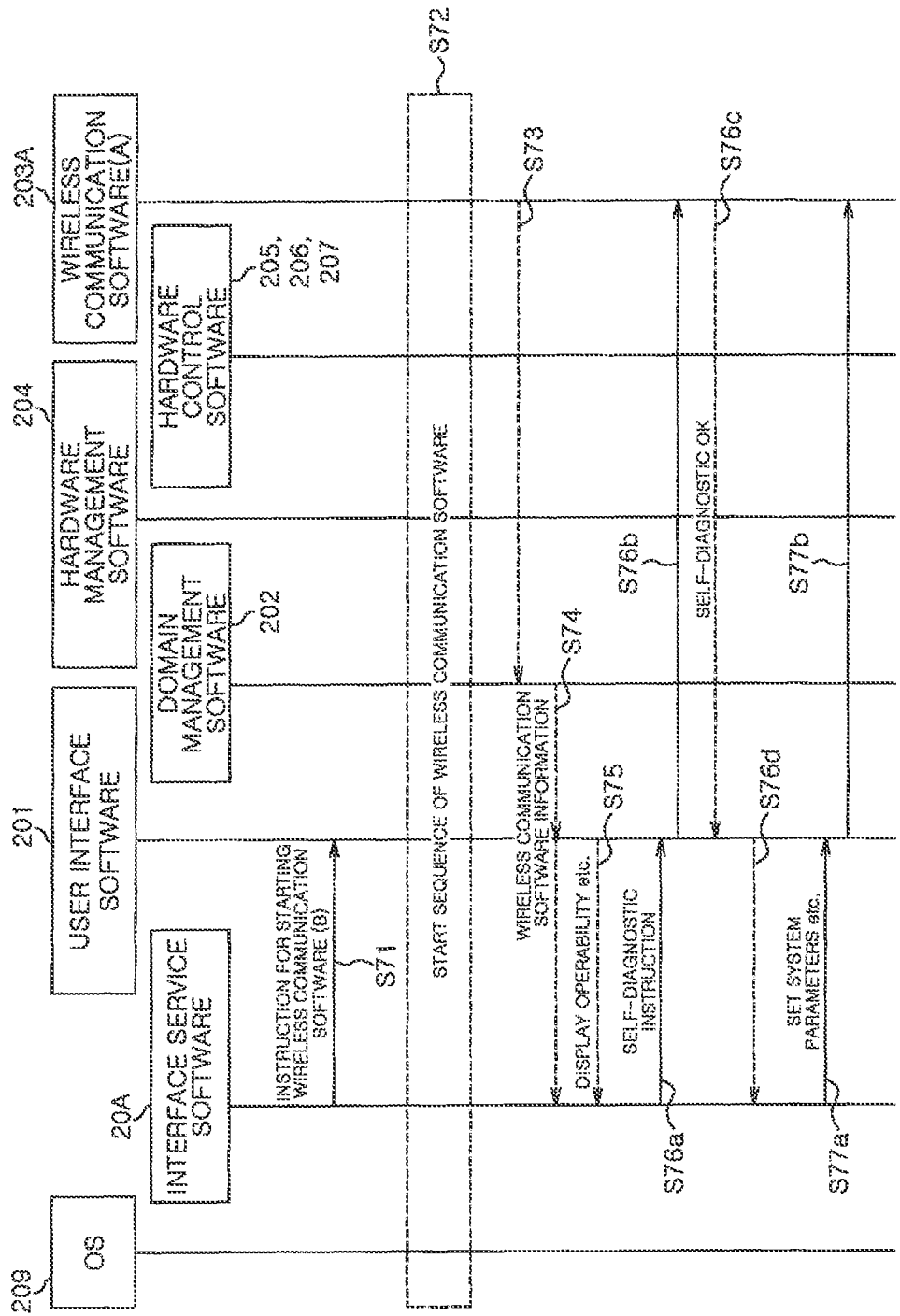

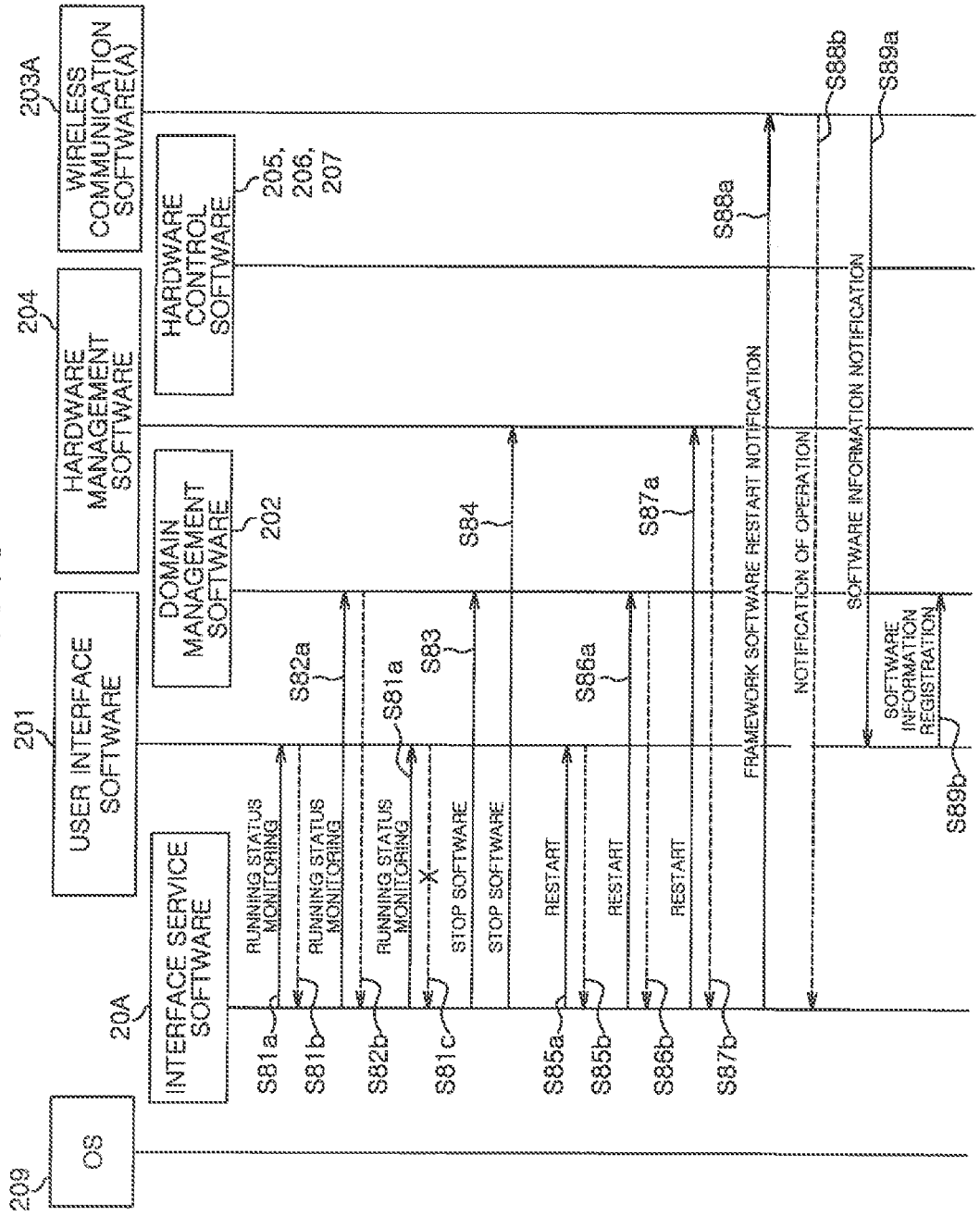

SOFTWARE WIRELESS DEVICE

TECHNICAL FIELD

The present disclosure relates to a software wireless device and is applicable to a software wireless device that detects a failure of wireless communication software or the like.

BACKGROUND

With the recent expansion and complexity of information systems, in order to minimize development costs of a system and facilitate maintenance after the operation of the system, there is a need to implement the division, distribution, and arrangement of functions of the system, the componentization and reuse thereof, and the adoption and interoperability of standard technologies.

To this end, distributed object technology has been adopted, and for example, Common Object Request Broker Architecture (CORBA) is widely used as the standard for distributed object technology. CORBA is standard technology for providing a software bus in order to allow a client to access an object in a server in a distributed environment and is a specification standardized by a standardization organization called Object Management Group (OMG). In CORBA, an interface may be regulated using an interface definition language (IDL) that is a language for defining an interface that does not depend on an operating system (OS), and a method present in the interface may be invoked to execute software functions of other modules. A physical connection is performed through a connection medium corresponding to Internet Protocol (IP)/Internet Inter-ORB Protocol (IIOP) communication.

On the other hand, software wireless devices are wireless devices that may respond to a plurality of radio systems in the same hardware resource of the wireless device by switching an execution program of the wireless device using a software program. In software wireless devices, by downloading a file defining a desired function from a network, the configuration of a module in the software wireless device may be changed, and a plurality of wireless communication systems may be implemented. Even in software wireless devices, by using distributed object technology, a transceiver function implemented by combining a plurality of software programs as parts (components) has been developed.

A transceiver function is implemented by downloading a software program that implements a modulation/demodulation method, a frequency, and a function suitable for the purpose. When distributed object technology such as CORBA is used, even when software programs (wireless communication software) of a modem unit that modulates and demodulates, a security unit, a communication method unit (protocol unit), and a control unit are distributed and disposed in a system, interconnection may be possible, and an overall system of a software wireless device may be implemented.

RELATED ART DOCUMENTS

Patent Document 1: Japanese Patent Application Publication No. 2016-103217
Patent Document 2: Japanese Patent Application Publication No. 2006-309413
Patent Document 3: Japanese Patent Application Publication No. H08-234968

SUMMARY

In order to start wireless communication software with environmental software such as domain management software, an interface and a communication procedure regulated in a software communication architecture (SCA) (hereinafter, simply referred to as "regulated") are used therebetween. However, software failure detection after the completion of the start or an operation at the time of failure is not regulated. In addition, there is no clear definition or method for the recovery of a software program for installing a wireless communication software program (hereinafter, referred to as "framework software"), and when an abnormality occurs in the framework software, it is not possible to recover the framework software.

The present disclosure provides a software wireless device for detecting a failure of framework software.

In view of the above, in accordance with an aspect of the present disclosure, there is provided a software wireless device that includes a plurality of hardware modules and downloads wireless communication software to control the plurality of hardware modules from an external source to implement a transceiver function. The software wireless device includes framework software configured to install the wireless communication software, and interface service software disposed to be managed directly by an operating system (OS) and configured to manage a user interface service and the framework software. The framework software includes user interface software, domain management software, hardware management software, and hardware control software. Further, the interface service software issues a running status monitoring request to the user interface software and the domain management software, and, when there is no response from the user interface software or the domain management software, the interface service software determines that there is an abnormality.

Effect

According to a software wireless device, it is possible to detect a failure of framework software.

BRIEF DESCRIPTION OF THE DRAWINGS

FIGS. 8A to 8C show a start sequence of the software wireless device of FIG. 7.

FIG. 9 is a diagram illustrating a failure detection and a recovery sequence of framework software of the software wireless device of FIG. 7.

DETAILED DESCRIPTION

Figure 1:
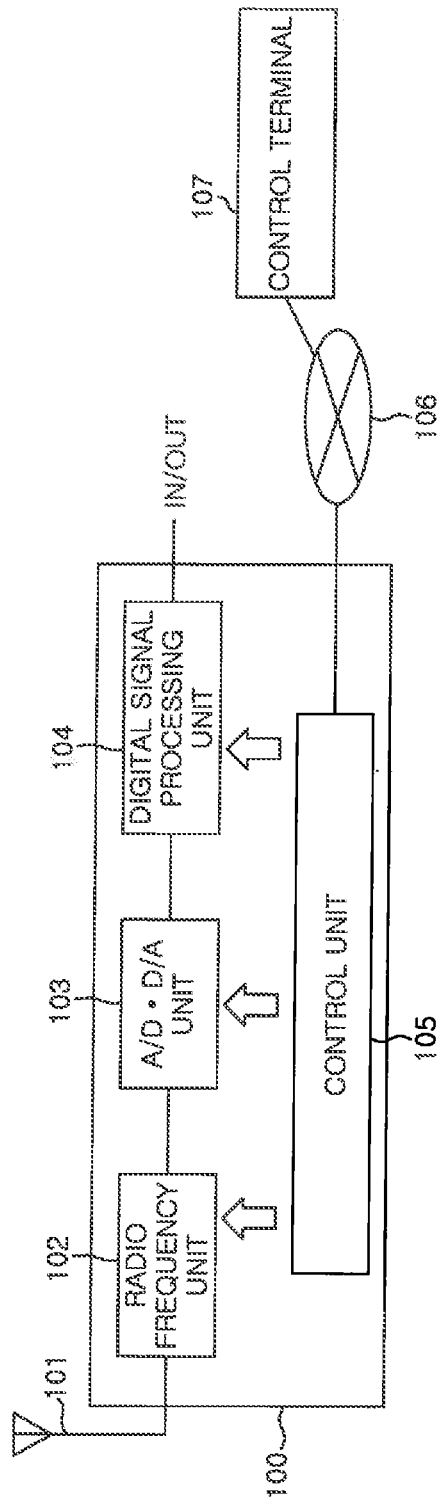
FIG. 1 is a diagram for describing a software wireless device.

Hereinafter, embodiments will be described with reference to the accompanying drawings. In the following descriptions, like reference numerals will be given to like parts having substantially the same function and configuration, and a redundant description thereof will be omitted.

Software wireless technology is wireless communication technology capable of switching a wireless communication method by changing control software without changing a hardware itself. FIG. 1 illustrates an overview of a software wireless device 100. Hardware modules of the software wireless device 100 include an antenna 101, a radio frequency unit 102, an A/D•D/A unit 103, a digital signal processing unit 104, and a control unit 105. The antenna 101 transmits and receives radio frequency signals. The radio frequency unit 102 converts a reception signal having a radio frequency band received by the antenna 101 into a reception signal having a low frequency band or converts a transmission signal having a low frequency band into a transmission signal having a radio frequency band. The A/D•D/A unit 103 converts a received analog signal into a digital signal or converts a digital signal to be transmitted into an analog signal. The digital signal processing unit 104 performs a transmission signal encoding process, a reception signal decoding process, or the like. The control unit 105 includes, for example, a memory for storing software programs (software programs shown in FIGS. 2 and 7 to be described below), and a central processing unit (CPU) for executing the software programs stored in the memory. The control unit 105 is controlled by a control terminal 107 through a network 106 and concurrently controls the hardware modules of the software wireless device.

First Embodiment

Figure 2:
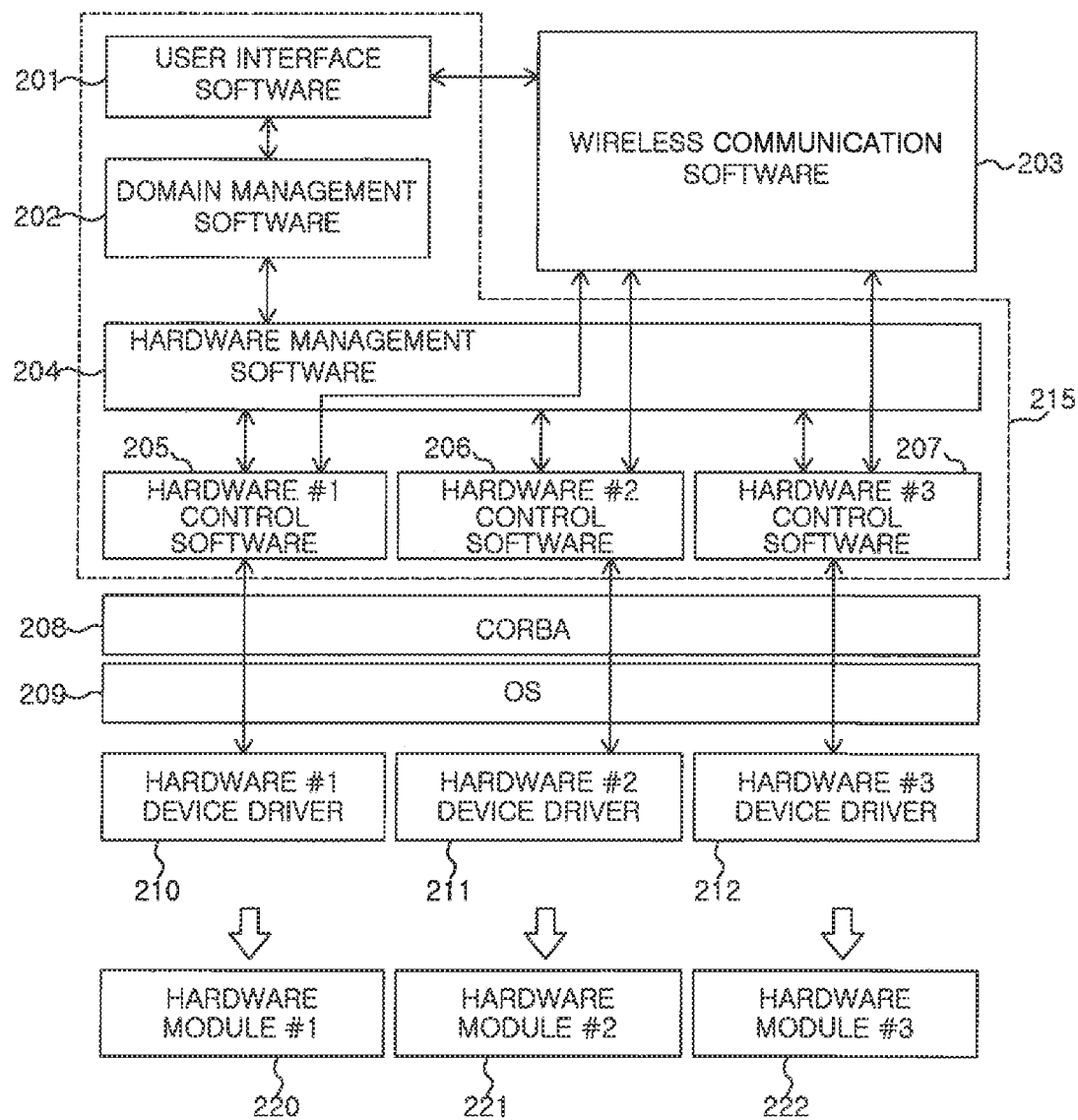
FIG. 2 shows a software structure of a software wireless device according to a first embodiment.

FIG. 2 illustrates a software structure of a software wireless device of a first embodiment.

Hardware modules 220 to 222 correspond to the radio frequency unit 102, the A/D•D/A unit 103, and the digital signal processing unit 104 of FIG. 1, respectively. Hardware device drivers 210 to 212 drive the hardware modules 220 to 222, respectively. The hardware device drivers 210 to 212 operate on a predetermined operating system (OS) 209, but CORBA middleware 208 makes it possible to separate an application from the OS and hardware. When power is applied to the software wireless device 100, first, the OS 209, the hardware device drivers 210 to 212, and the CORBA middleware 208 are started. Then, framework software 215 is started. The framework software 215 is a software program that needs to always be started in order for the software wireless device 100 to operate. The framework software 215 includes user interface software 201, domain management software 202, hardware management software 204, hardware control software 205, hardware control software 206, and hardware control software 207. The hardware control software 205, hardware control software 206, and hardware control software 207 are installed to respectively correspond to the hardware device drivers 210 to 212 and are higher level software programs that control the hardware device drivers 210 to 212.

As features of the software wireless device 100, wireless functions such as filter, modulation and demodulation, equalization, and synchronization functions may be programmed, and intrinsic wireless functions of a system such as modulation method, transmission/reception frequency, bandwidth, and transmission speed, which are wireless parameters, may be changed by rewriting a software program. Such a rewritable software program is wireless communication software 203. For this reason, the wireless communication software 203 may be started even when power is applied but is mostly started based on an instruction of the user interface software 201.

The user interface software 201 accesses/communicates with the domain management software 202 and instructs the installation and deletion of the wireless communication software 203. In addition, the user interface software 201 accesses/communicates with the wireless communication software 203 and sets and acquires parameters. The domain management software 202 accesses the hardware management software 204 in addition to the user interface software 201 and performs operations of installing and deleting the wireless communication software 203. In addition, the domain management software 202 accesses/communicates with the wireless communication software 203, sets and acquires an initial parameter, and grants access between pieces of software.

The hardware management software 204 accesses the hardware control software 205, the hardware control software 206, and the hardware control software 207 and performs operations of installing and deleting the wireless communication software 203. The hardware control software 205, the hardware control software 206, and the hardware control software 207 access the wireless communication software 203 to provide notification of program execution and termination. In addition, the hardware control software 205, the hardware control software 206, and the hardware control software 207 access the hardware device drivers 210, 211, and 212, respectively.

Figure 3:
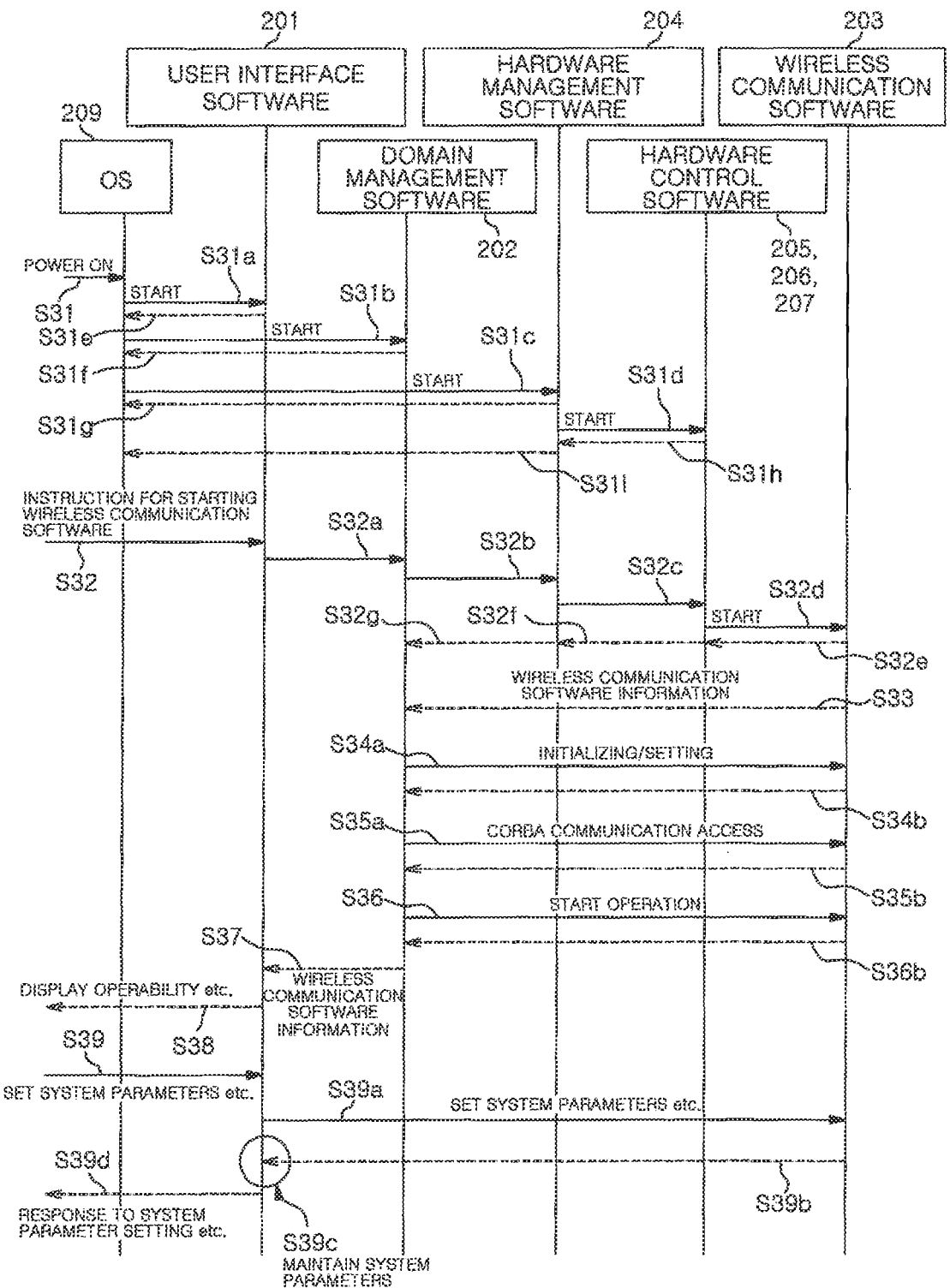
FIG. 3 shows a start sequence of the software wireless device of FIG. 2.

FIG. 3 illustrates a start sequence of the software wireless device shown in FIG. 2.

When the software wireless device 100 is powered on (step S31), first, the OS 209, the hardware device drivers 210, 211, and 212, and the CORBA middleware 208 are started. Subsequently, the OS 209 starts the user interface software 201, the domain management software 202, and the hardware management software 204 (steps S31a to S31c). In this case, the user interface software 201, the domain management software 202, and the hardware management software 204 transmit an acknowledgment, which indicates that the user interface software 201, the domain management software 202, and the hardware management software 204 have started, to the OS 209 (steps S31e to S31g). The hardware management software 204 starts the hardware control software 205, the hardware control software 206, and the hardware control software 207 (step S31d), and the hardware control software 205, the hardware control software 206, and the hardware control software 207 transmit an acknowledgment, which indicates that the hardware control software 205, the hardware control software 206, and the hardware control software 207 have started, to the hardware management software 204 (step S31h). In addition, the hardware management software 204 transmits an acknowledgment, which indicates that the hardware control software 205, the hardware control software 206, and the hardware control software 207 have started, to the OS 209 (step S31i). Therefore, the user interface software 201, the domain management software 202, the hardware management software 204, and the hardware control software 205, the hardware control software 206, and the hardware control software 207 are started as the framework software 215.

When a user gives an instruction for starting wireless communication software to the user interface software 201 (step S32), the user interface software 201 instructs the wireless communication software 203 to be started through an interface regulated in the domain management software 202 (step S32a). The domain management software 202 instructs the hardware control software 205, the hardware control software 206, and the hardware control software 207 to start the wireless communication software 203 through the hardware management software 204 (steps S32b and S32c). The hardware control software 205, the hardware control software 206, and the hardware control software 207 start the wireless communication software 203 (step S32d). The wireless communication software 203 transmits an acknowledgment, which indicates that the wireless communication software 203 has started, to the domain management software 202 through the hardware control software 205, the hardware control software 206, the hardware control software 207, and the hardware management software 204 (steps S32e to S32g). The wireless communication software 203 transmits wireless communication software information to the domain management software 202 (step S33). When the wireless communication software 203 is started, the wireless communication software 203 operates as a CORBA servant. Thereafter, the domain management software 202 executes an initializing or setting process using CORBA communication with the wireless communication software 203 (step S34a). The wireless communication software 203 transmits an acknowledgment indicating that the initializing or setting process has been executed (step S34b). After that, a CORBA communication access process between software programs of the wireless communication software 203 is performed (step S35a), and the wireless communication software 203 transmits an acknowledgment indicating that the CORBA communication access process has been performed (step S35b). Next, the wireless communication software 203 and the user interface software 201 access each other, the domain management software 202 instructs the wireless communication software 203 to start operating (step S36a), and the wireless communication software 203 transmits an acknowledgment to the domain management software 202 (S36b), thereby enabling a system operation. The domain management software 202 transmits wireless communication software information to the user interface software 201 (step S37), and the user interface software 201 displays operability and the like (step S38).

When the user gives an instruction for setting system parameters or the like to the user interface software 201 (step S39), the user interface software 201 sets the system parameters in the wireless communication software 203 (step S39a). The wireless communication software 203 transmits an acknowledgment, which indicates that the system parameters have been set, to the user interface software 201 (step S39b). Here, the user interface software 201 maintains the system parameters (step S39c) and transmits an acknowledgment or the like indicating that the system parameters have been set (step S39d).

Figure 4:
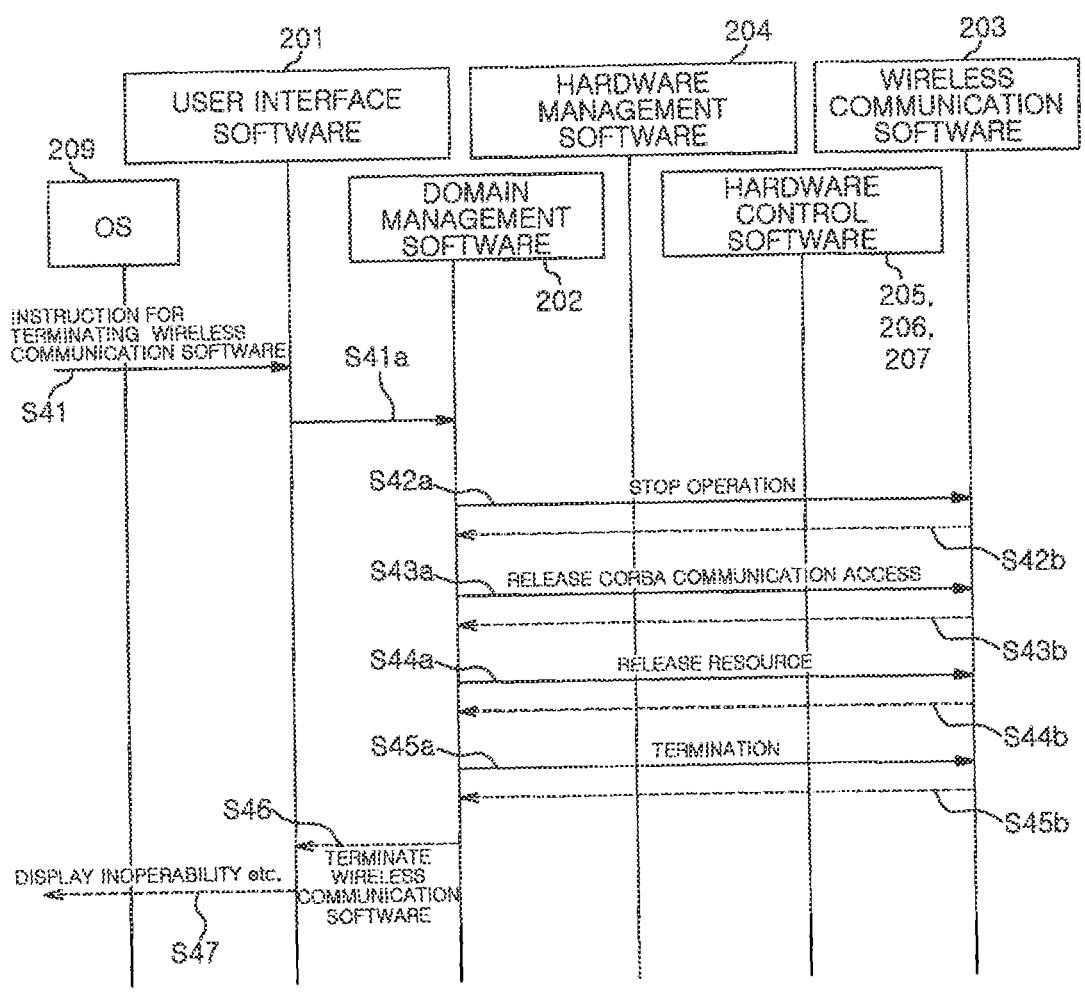
FIG. 4 shows a termination sequence of the software wireless device of FIG. 2.

FIG. 4 illustrates a termination sequence of the software wireless device of FIG. 2.

In the termination sequence, when the user gives an instruction for terminating wireless communication software to the user interface software 201 (step S41), the user interface software 201 instructs the domain management software 202 to terminate the wireless communication software 203 (step S41a). The domain management software 202 instructs the wireless communication software 203 to stop operation (step S42a), releases CORBA communication access between pieces of software (step S43), and releases a software object (resource) (step S44) to terminate the wireless communication software 203 (step S45). In this case, the wireless communication software 203 transmits an acknowledgement to the domain management software 202 (steps S42b, S43b, S44b, and S45b). In this case, the framework software 215 including the hardware control software 205, the hardware control software 206, and the hardware control software 207 is not terminated and maintains a started state without change.

When the domain management software 202 receives a termination response from the wireless communication software 203, the domain management software 202 notifies the user interface software 201 of the termination of the wireless communication software (step S46), and the user interface software 201 displays inoperability and the like (step S47).

Figure 5:
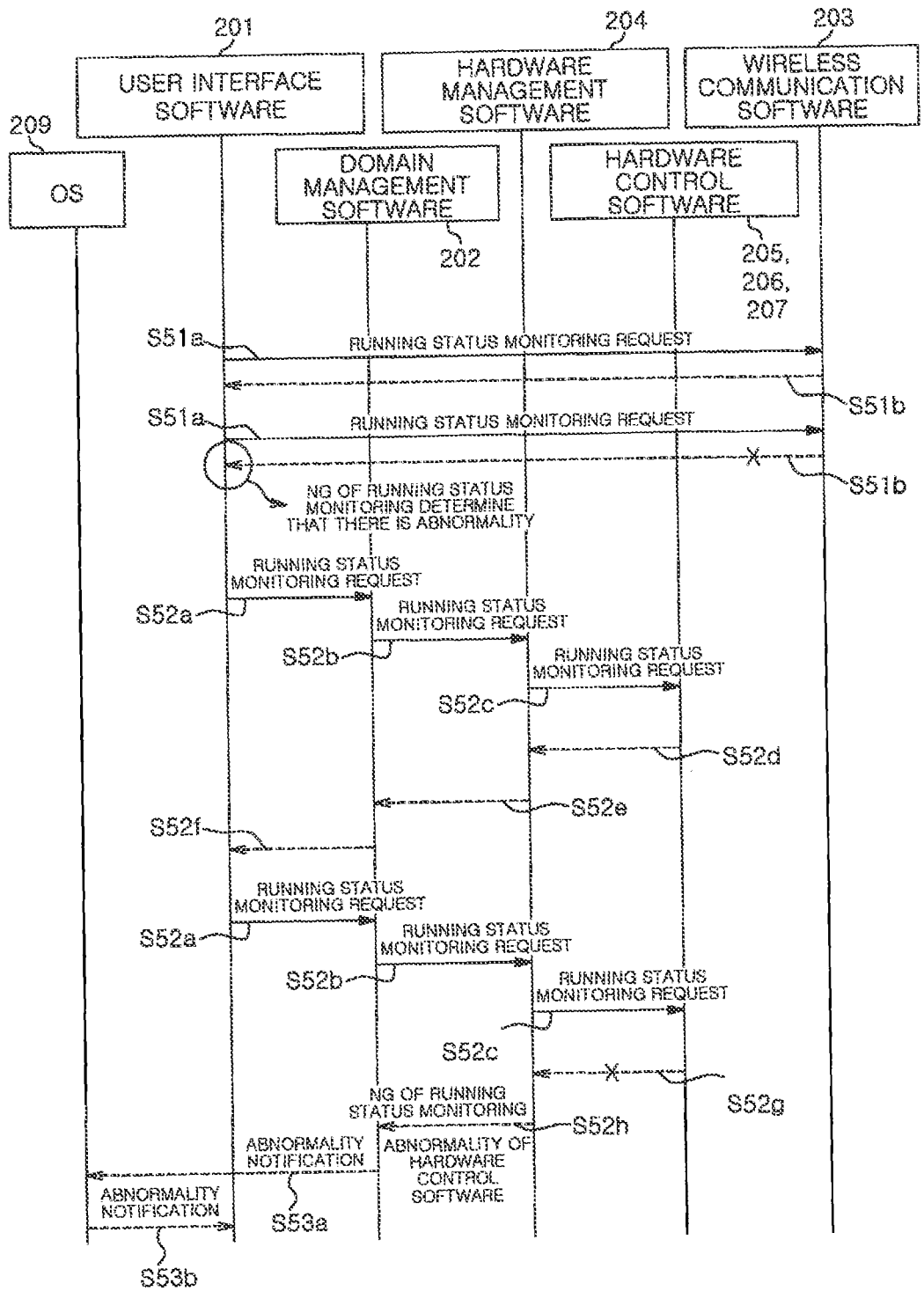
FIG. 5 shows a failure detection sequence of the software wireless device of FIG. 2.

Next, determination of a failure will be described. FIG. 5 illustrates a failure determination sequence of the software wireless device of FIG. 2. The failure determination is performed by the user interface software 201. The following two procedures are performed.

First, running status monitoring on the wireless communication software 203 is performed by a status acquisition command through a regulated interface. The user interface software 201 transmits a status acquisition command (running status monitoring request) to the wireless communication software 203 (step S51a). When there is a response to the running status monitoring request (step S51b), the software wireless device is determined to be normal, and when there is no response to the running status monitoring request or there is communication abnormality (step S51c), it is determined that there is a failure (abnormality).

Second, the domain management software 202 is invoked, and running status monitoring is performed on the hardware control software 205, the hardware control software 206, and the hardware control software 207 using a regulated interface through the hardware management software 204. The user interface software 201 transmits a running status monitoring request to the hardware control software 205, the hardware control software 206, and the hardware control software 207 (steps S52a to S52c), and the hardware control software 205, the hardware control software 206, and the hardware control software 207 transmit an acknowledgment to the user interface software 201 through the hardware management software 204 and the domain management software 202 (steps S52d and S52e). When the hardware management software 204 detects a communication abnormality in the regulated interface (step S52g), the hardware management software 204 notifies the domain management software 202 of No Good (NG) of the running status monitoring (abnormality of the hardware control software 205, the hardware control software 206, and the hardware control software 207) (step S52h), the domain management software 202 issues an abnormality notification to the OS 209 (step S53a), and the user interface software 201 performs determination by receiving the abnormality notification from the OS 209 (step S53b).

Figure 6:
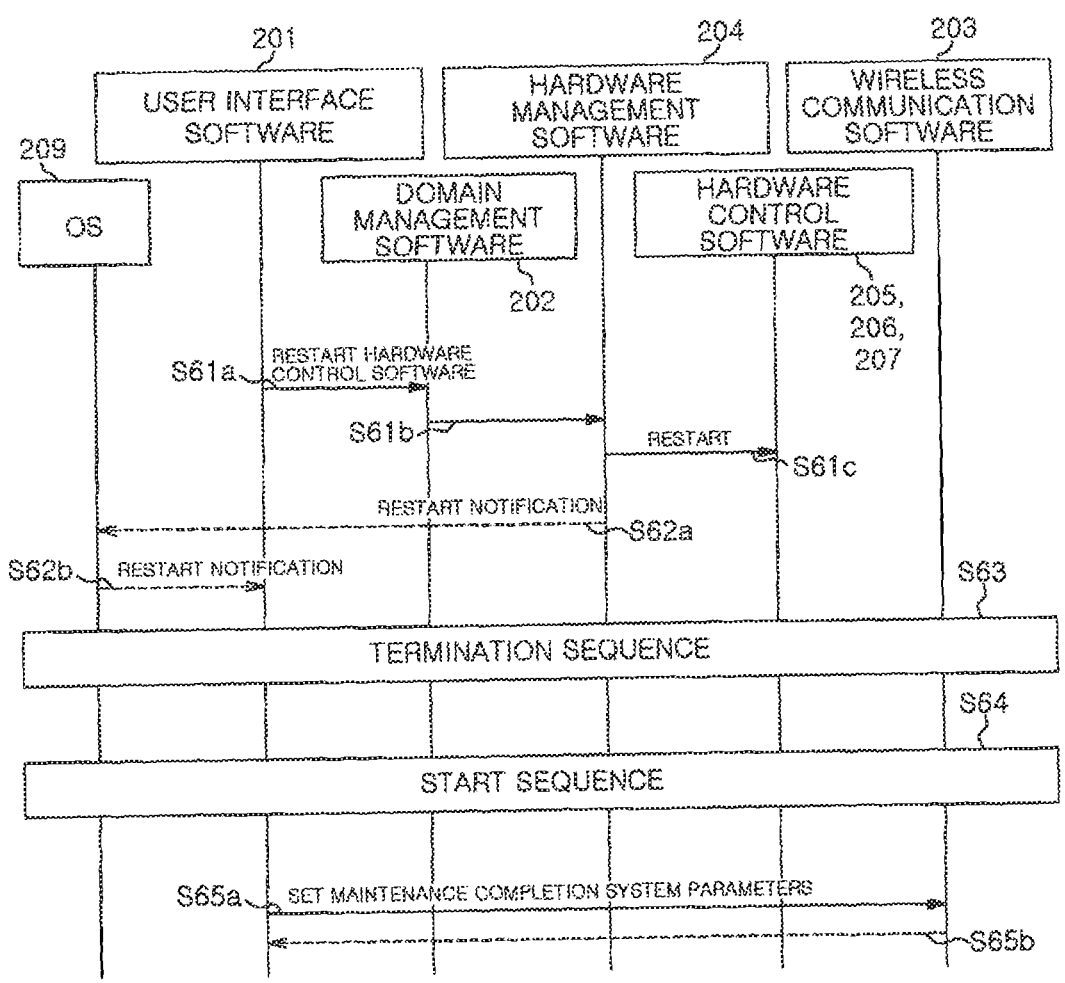
FIG. 6 shows a recovery sequence of the software wireless device of FIG. 2.

In the two procedures, the user interface software 201 detects a failure of a software program (failure such as a memory access violation or a hardware error) and then restarts and recovers the wireless communication software 203. FIG. 6 illustrates a recovery sequence of the software wireless device of FIG. 2.

The user interface software 201 detecting the failure terminates and starts (restarts) the wireless communication software 203. Such a flow is similar to the termination sequence of FIG. 4 and the start sequence of FIG. 3.

However, in this case, an abnormality notification of one of the hardware control software 205, the hardware control software 206, and the hardware control software 207 is received, the corresponding hardware control software 205, 206, or 207 is restarted, and then, the wireless communication software 203 is restarted, and maintained parameters are set in the wireless communication software 203 again. The flow of the recovery will be described with reference to FIG. 6.

The user interface software 201 restarts the hardware control software, in which the abnormality notification has been received among the hardware control software 205, the hardware control software 206, and the hardware control software 207, through the domain management software 202 and the hardware management software 204 (steps S61a, S61b, and S61c). After that, the hardware management software 204 notifies the OS 209 of the restart of the hardware control software (step S62a). The OS 209 notifies the user interface software 201 of the restart of the hardware control software (step S62b).

Next, the user interface software 201 performs a termination sequence (after step S41a of the termination sequence of FIG. 4) to terminate the wireless communication software 203 (step S63). After that, the user interface software 201 performs a start sequence (steps S32a to S38 of the start sequence of FIG. 3) to start the wireless communication software 203 (step S64).

Next, the user interface software 201 sets the system parameters maintained in step S39c of the start sequence of FIG. 3 in the wireless communication software 203 (step S65a), and the wireless communication software 203 transmits an acknowledgment to the user interface software 201 (step S65b).

Therefore, it is possible to return a system to an operating state without restarting the entire system.

In addition, in a software recovery sequence when an abnormality is detected in wireless communication software, steps S63, S64, S65a, and 65b of the recovery sequence shown in FIG. 6 are performed.

In the present embodiment, (A) user interface software detects a failure of wireless communication software and hardware control software. In addition, (B) normal setting values of wireless communication software are maintained. Furthermore, (C) wireless communication software or hardware control software, in which failed software is used, is specified, and the wireless communication software is terminated. In addition, (D) the wireless communication software and hardware control software terminated in (C) are started. Furthermore, (E) in the wireless communication software started in (D), the setting values are reset to the setting values maintained in (B).

According to the present embodiment, it is possible to quickly detect a failure of wireless communication software and hardware control software. Furthermore, when the failure is detected, an automatic recovery is performed, and then, the setting values are reset to the values before the failure occurred, thereby immediately returning a system of a software wireless device to a normal state before the failure. As a result, reliability can be improved by minimizing a system operation downtime of the software wireless device.

Second Embodiment

Figure 7:
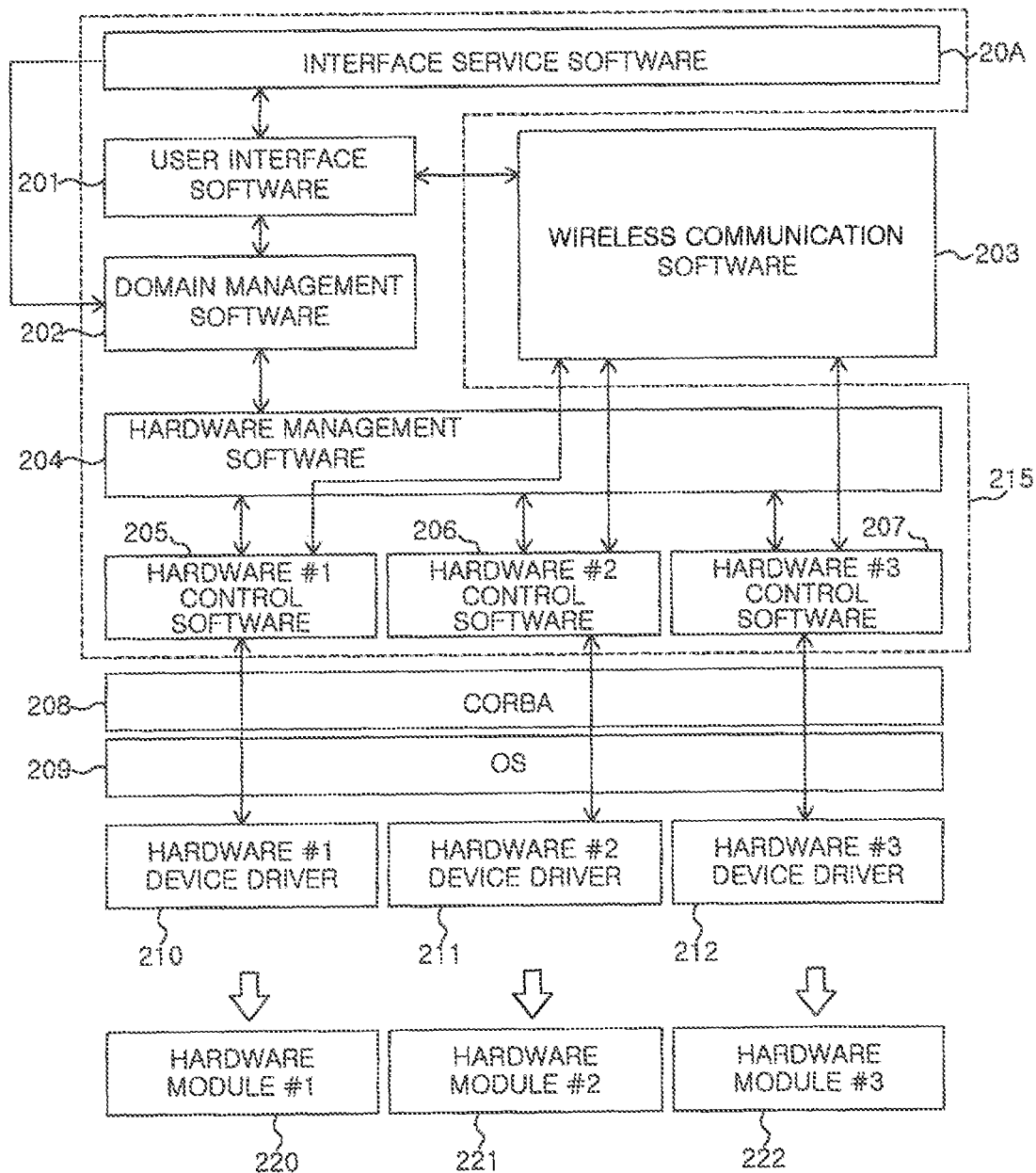
FIG. 7 shows a software structure of a software wireless device according to a second embodiment.

FIG. 7 illustrates a software structure of a software wireless device of a second embodiment.

In the software wireless device of the second embodiment, interface service software is added to the software wireless device of the first embodiment. Interface service software 20A is disposed between user interface software 201 and the outside of a system and manages a user interface service. In addition, the interface service software 20A is disposed so as to be managed directly by an OS 209, and framework software 215 such as the user interface service or domain management software 202 is managed by the interface service software 20A.

In the first embodiment, wireless communication software 203 is started in accordance with an instruction from the user interface software 201, but in the second embodiment, the wireless communication software 203 is started in accordance with an instruction from the interface service software 20A.

The interface service software 20A accesses/communicates with the user interface software 201 and instructs the parameter setting and the installation and deletion of the wireless communication software 203. In addition, the interface service software 20A accesses/communicates with the domain management software 202 to perform running status monitoring.

The interface service software 20A starts the framework software 215 and manages an execution state of the framework software 215 such as the user interface software 201 and the domain management software 202. In addition, after the wireless communication software 203 is started, a self-diagnostic is performed, and when there is a problem in the diagnostics result, compatible wireless communication software 203 is started. As a result, without waiting for an instruction from a user, the wireless communication software 203 operable on a system can be disposed, and an operation time of a service can be secured. In addition, in this case, the interface service software 20A directly accesses the wireless communication software 203 to be in a state that system parameters can be exchanged.

Figure 8A:
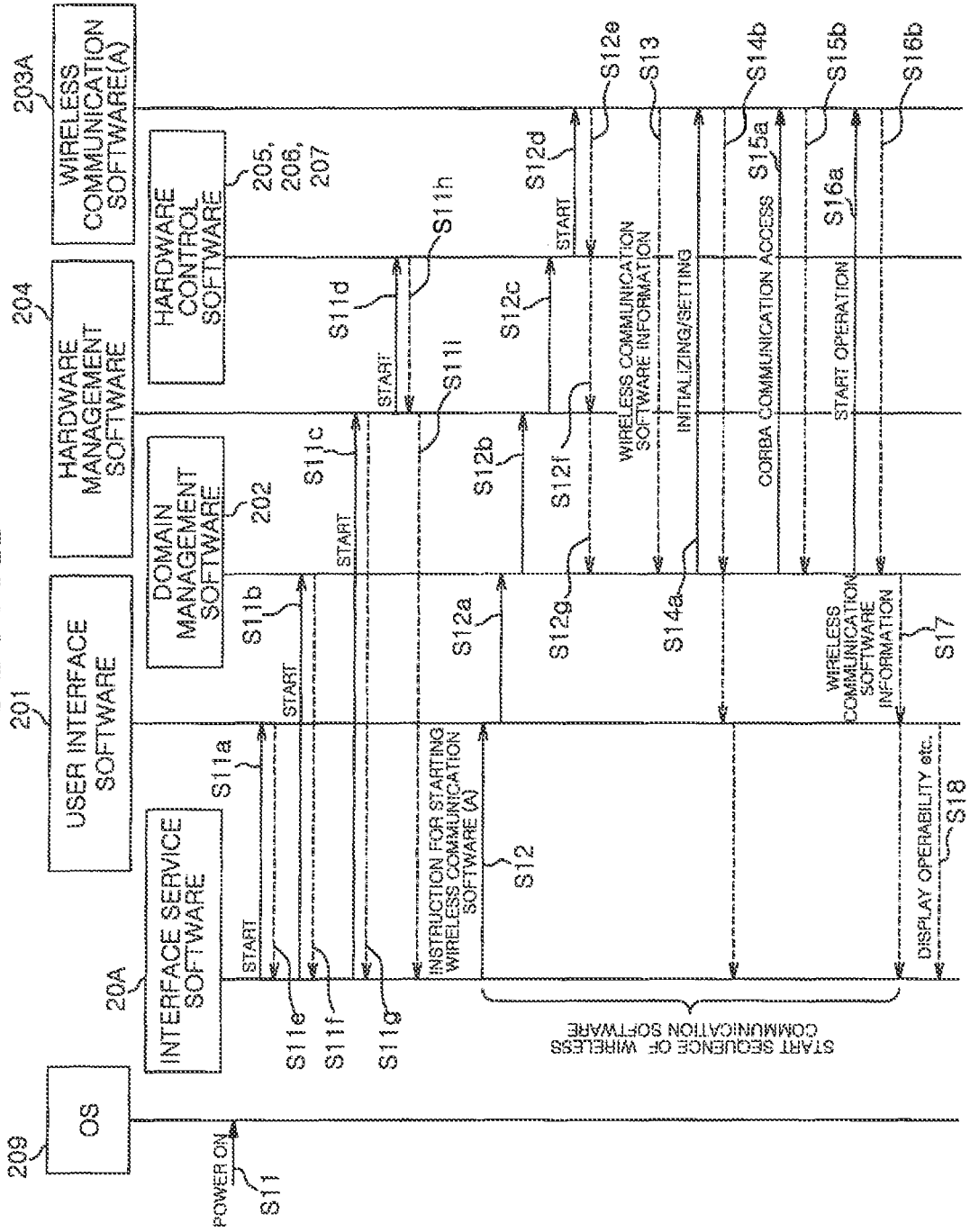
Figure 8B:
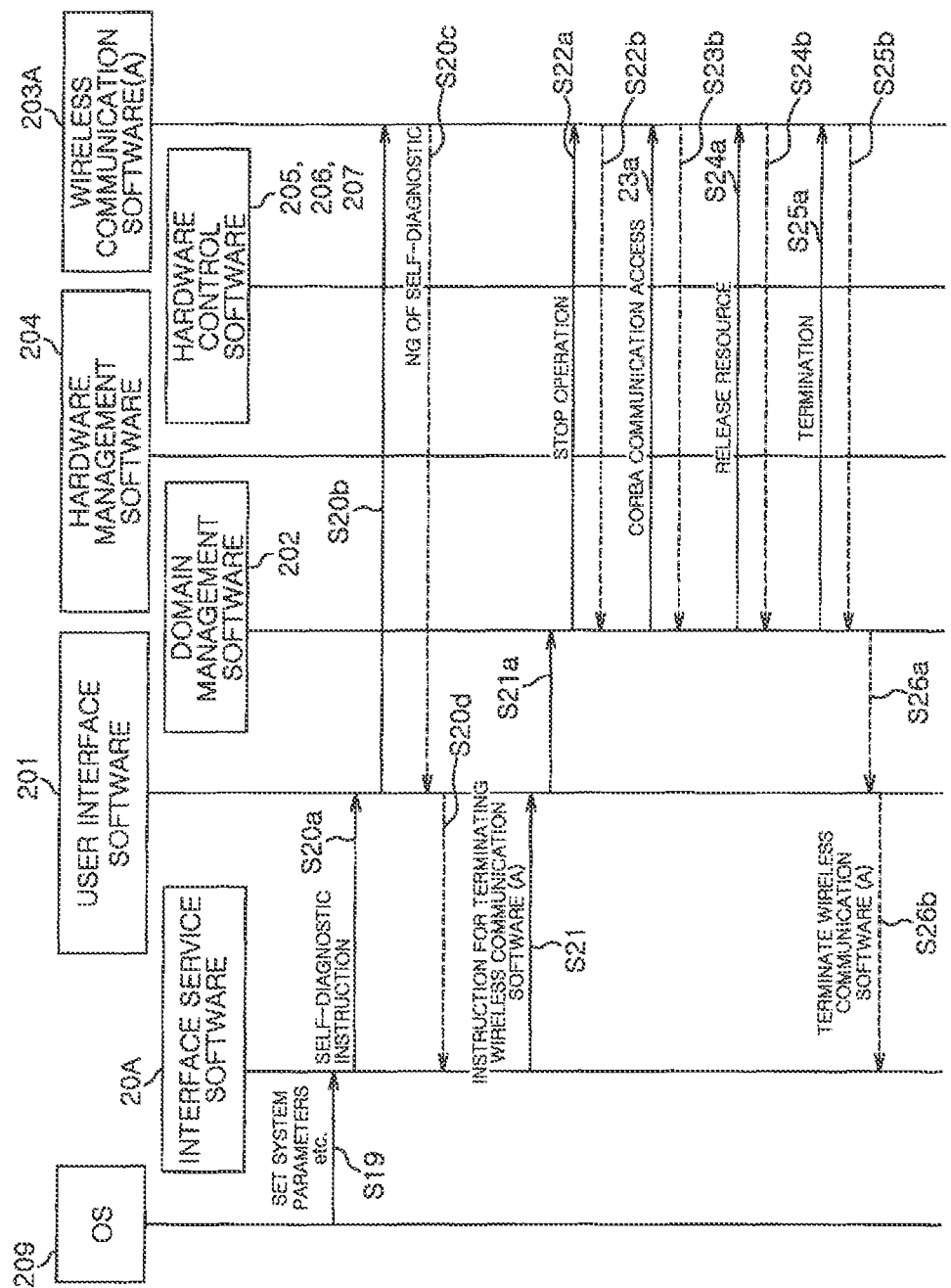

FIGS. 8A to 8C illustrate a start sequence of the software wireless device shown in FIG. 7.

When the software wireless device 100 is powered on (step S11), first, the OS 209, hardware device drivers 210, 211, and 212, and CORBA middleware 208 are started. Subsequently, the OS 209 starts the interface service software 20A, and the interface service software 20A starts the user interface software 201, the domain management software 202, and hardware management software 204 (steps S11a to S11c). In this case, the user interface software 201, the domain management software 202, and the hardware management software 204 transmit an acknowledgment, which indicates that the user interface software 201, the domain management software 202, and the hardware management software 204 have started, to the interface service software 20A (steps S11e to S11g). The hardware management software 204 starts hardware control software 205, hardware control software 206, and hardware control software 207 (step S11d), and the hardware control software 205, the hardware control software 206, and the hardware control software 207 transmit an acknowledgment, which indicates that the hardware control software 205, the hardware control software 206, and the hardware control software 207 have started, to the hardware management software 204 (step S11h). In addition, the hardware management software 204 transmits an acknowledgment, which indicates that the hardware control software 205, the hardware control software 206, and the hardware control software 207 have started, to the interface service software 20A (step S11i). Therefore, the user interface software 201, the domain management software 202, the hardware management software 204, the hardware control software 205, the hardware control software 206, and the hardware control software 207 are started as the framework software 215.

When the user gives an instruction for starting wireless communication software to the user interface software 201 through the interface service software 20A (step S12), the user interface software 201 instructs the wireless communication software (A) 203A to be started through an interface regulated in the domain management software 202 (step S12a). The domain management software 202 instructs the hardware control software 205, the hardware control software 206, and the hardware control software 207 to start the wireless communication software (A) 203A through the hardware management software 204 (steps S12b and S12c). The hardware control software 205, the hardware control software 206, and the hardware control software 207 start the wireless communication software (A) 203A (step S12d). The wireless communication software (A) 203A transmits an acknowledgment, which indicates that the wireless communication software (A) 203A has started, to the domain management software 202 through the hardware control software 205, the hardware control software 206, the hardware control software 207, and the hardware management software 204 (steps S12e to S12g). The wireless communication software (A) 203A transmits wireless communication software information to the domain management software 202 (step S13). When the wireless communication software (A) 203A is started, the wireless communication software (A) 203A operates as a CORBA servant. Thereafter, the domain management software 202 executes an initializing or setting process using CORBA communication with the wireless communication software 203 (step S14a). The wireless communication software (A) 203A transmits an acknowledgment indicating that the initializing or setting process has been executed (step S14b). After that, a CORBA communication access process between software programs of the wireless communication software (A) 203A is performed (step S15a), and the wireless communication software (A) 203A transmits an acknowledgment indicating that the CORBA communication access process has been performed (step S15b). Next, the wireless communication software (A) 203A and the user interface software 201 access each other, the domain management software 202 instructs the wireless communication software (A) 203A to start operating (step S16a), and the wireless communication software (A) 203A transmits an acknowledgment to the domain management software 202 (S16b), thereby enabling a system operation. The domain management software 202 transmits wireless communication software information to the user interface software 201 (step S17), and the user interface software 201 transmits the wireless communication software information, an operable display, and the like to the interface service software 20A (step S18).

When the OS 209 gives an instruction for setting system parameters to the interface service software 20A (step S19), the interface service software 20A maintains the system parameters and instructs the wireless communication software (A) 203A to perform a self-diagnostic through the user interface software 201 (steps S20a and S20b). When there is a problem in a diagnostics result of the self-diagnostic, the wireless communication software (A) 203A notifies the interface service software 20A that there is the problem in the diagnostics result of the self-diagnostic (NG of the self-diagnostic) through the user interface software 201 (steps S20c and S20d).

Next, as shown in FIG. 8B, when the interface service software 20A gives an instruction for terminating the wireless communication software (A) 203A to the user interface software 201 (step S21), the user interface software 201 instructs the domain management software 202 to terminate the wireless communication software (A) 203A (step S21a). The domain management software 202 instructs the wireless communication software (A) 203A to stop operation (step S22a), releases CORBA communication access between pieces of software (step S23), and releases a software object (resource) (step S24a) to terminate the wireless communication software (A) 203A (step S25a). Here, the wireless communication software (A) 203A transmits an acknowledgement to the domain management software 202 (steps S22b, S23b, S24b, and S25b). In this case, the framework software 215 including the hardware control software 205, the hardware control software 206, and the hardware control software 207 is not terminated and maintains a started state without change.

When the domain management software 202 receives a termination response from the wireless communication software (A) 203A, the domain management software 202 notifies the interface service software 20A of the termination of the wireless communication software (A) 203A through the user interface software 201 (steps S26a and 26b).

Next, as shown in FIG. 8C, the interface service software 20A gives an instruction for starting the wireless communication software (B) 203B to the user interface software 201 (step S71). After that, a start sequence of wireless communication software is performed as in steps S32a to S36a of FIG. 3 (step S72). The wireless communication software (B) 203B transmits an acknowledgment to the domain management software 202 (step S73), thereby enabling a system operation. The domain management software 202 transmits wireless communication software information to the user interface software 201 (step S74), and the user interface software 201 transmits the wireless communication software information, an operable display, and the like to the interface service software 20A (step S75).

The interface service software 20A instructs the wireless communication software (B) 203B to perform a self-diagnostic through the user interface software 201 (steps S76a and S76b). When there is no problem in a diagnostics result of the self-diagnostic, the wireless communication software (B) 203B notifies the interface service software 20A that there is no problem in the diagnostics result of the self-diagnostic (OK of self-diagnostic) through the user interface software 201 (steps S76c and S76d).

The interface service software 20A instructs the wireless communication software (B) 203B to set the system parameters maintained in step S39 through the user interface software 201 (steps S77a and S77b).

In the first embodiment, the user interface software 201 and the domain management software 202 cannot be monitored, but in the second embodiment, the interface service software 20A can monitor the user interface software 201 and the domain management software 202.

FIG. 9 illustrates a failure detection and a recovery sequence of framework software of the software wireless device of FIG. 7.

The interface service software 20A manages an execution state of the framework software 215 and periodically executes running status monitoring information on software executed by the interface service software 20A (steps S81a, S81b, S82a, and S82b). As a result, for example, when the user interface software 201 determines that there is a failure such as a memory access violation or a hardware error, the interface service software 20A stops, one time, the execution (software) of pieces of framework software (domain management software 202 and hardware management software 204) that access failed software excluding the interface service software 20A (steps S83 and S84). After that, the interface service software 20A instructs the restart of the user interface software 201, the domain management software 202, and the hardware management software 204

(steps S85a, S86a, and S87a), and the user interface software 201, the domain management software 202, and the hardware management software 204 transmit a response indicating that the user interface software 201, the domain management software 202, and the hardware management software 204 have started (steps S85b, S86b, and S87b).

In this case, when the wireless communication software 203 has not failed, the interface service software 20A accesses the wireless communication software 203 to notify the wireless communication software 203 that the framework software has restarted (step S88a). The wireless communication software 203 receiving the restart notification notifies the interface service software 20A that the wireless communication software 203 is in an operable state (notification of operation) (step S88b).

Furthermore, the wireless communication software 203 notifies the user interface software 201 of software information (step S89a). When the user interface software 201 registers the software information in the domain management software 202 (step S89b), the domain management software 202 grasps the software information to secure information equivalent to information before a failure or information of a normal start.

The failure detection and recovery of the wireless communication software 203, the hardware control software 205, the hardware control software 206, and the hardware control software 207 may be performed in the same manner as in the first embodiment.

In the present embodiment, (A) the interface service software 20A accesses framework software. B) Diagnostics is run on information of wireless communication software being started. Normal setting values of wireless communication software are maintained. (C) Failed framework software is specified and is terminated. D) The framework software terminated in (C) and framework software to be accessed are restarted. (E) In the restart of (D), the setting values are reset to the setting values maintained in (B). (F) Access with an external interface is released, and an entire software wireless system is initialized.

According to the present embodiment, it is possible to quickly detect a failure of framework software. Furthermore, when the failure is detected, an automatic recovery is performed, and then, the setting values are reset to the setting values before the failure occurred, thereby immediately returning a system of a software wireless device to a normal state before the failure. As a result, reliability can be improved by minimizing a system operation downtime of the software wireless device.

The invention made by the present inventors has been described above based on the embodiments, but the invention should not be limited to the embodiments, and it is needless to say that various modifications may be made to the invention.

EXPLANATION OF REFERENCE NUMERALS

100: software wireless device
101: antenna
102: radio frequency unit
103: A/D·D/A unit
104: digital signal processing unit
105: control unit
106: network
107: control terminal
201: user interface software
202: domain management software
203: wireless communication software
204: hardware management software
205, 206, 207: hardware control software
208: CORBA
209: OS
20A: interface service software
215: framework software

The invention claimed is:

1. A software wireless device that includes a plurality of hardware modules and downloads wireless communication software to control the plurality of hardware modules from an external source to implement a transceiver function, the software wireless device comprising:
   a memory for storing software and included in the plurality of hardware modules;
   a central processing unit (CPU) for executing the software stored in the memory and included in the plurality of hardware modules;
   framework software configured to install the wireless communication software; and
   interface service software disposed to be managed directly by an operating system (OS) and configured to manage a user interface service and the framework software,
   wherein the framework software includes user interface software, domain management software, hardware management software, and hardware control software,
   the interface service software issues a running status monitoring request to the user interface software and the domain management software, and
   when there is no response from the user interface software or the domain management software, the interface service software determines that there is an abnormality.

2. The software wireless device of claim 1,
   wherein, when there is an abnormality in the user interface software, the interface service software stops the domain management software and the hardware management software, restarts the user interface software, the domain management software, and the hardware management software, and notifies the wireless communication software that the framework software is restarted, and
   the user interface software registers software information in the domain management software based on a software information notification from the wireless communication software.

3. The software wireless device of claim 1,
   wherein, in a start sequence when power is supplied, the interface service software starts the wireless communication software through the user interface software, the domain management software, the hardware management software, and the hardware control software,
   the OS sets system parameters in the interface service software,
   the interface service software instructs the wireless communication software to perform a self-diagnostic,
   and when there is a problem in a diagnostics result of the self-diagnostic, the interface service software maintains the system parameters and instructs the user interface software to terminate the wireless communication software.

4. The software wireless device of claim 3,
   wherein, when there is the problem in the diagnostics result of the self-diagnostic, the interface service software starts another wireless communication software different from the wireless communication software through the user interface software, the domain management software, the hardware management software, and the hardware control software, the OS sets the system parameters in the interface service software, the interface service software instructs said another wireless communication software to perform a self-diagnostic, and when there is no problem in a diagnostics result of the self-diagnostic of said another wireless communication software, the system parameters are set in said another wireless communication software.

5. The software wireless device of claim 3, wherein the wireless communication software transmits a response indicating that the wireless communication software is started and transmits wireless communication software information to the domain management software, and the domain management software performs initializing and setting on the wireless communication software, performs Common Object Request Broker Architecture (CORBA) communication access between software programs of the wireless communication software, and instructs the wireless communication software to start operating.

6. The software wireless device of claim 5, wherein, in accordance with an instruction for terminating the wireless communication software given to the user interface software, the user interface software instructs the domain management software to terminate the wireless communication software, and the domain management software instructs the wireless communication software to stop operation, releases the CORBA communication access, releases a software object, and terminates the wireless communication software.

* * * * *